United States Patent [19]

Masaoka

[11] 3,720,277
[45] March 13, 1973

[54] DRIVING DEVICE FOR MOTOR DRIVEN VEHICLES
[75] Inventor: Yutaka Masaoka, Hamakita, Japan
[73] Assignee: Yamaha Hatsudoki Kabushiki Kaisha, Shizuoka-ken, Japan
[22] Filed: Sept. 24, 1970
[21] Appl. No.: 74,984

[30] Foreign Application Priority Data
Sept. 29, 1969 Japan..................44/92428

[52] U.S. Cl.....................180/5 R, 305/24
[51] Int. Cl. .............................B62m 27/02
[58] Field of Search....305/11, 12, 13, 24, 27, 35 EB; 180/5

[56] References Cited
UNITED STATES PATENTS
3,463,561   8/1969   Lamb......................305/27
3,527,506   9/1970   Erickson..................305/27

Primary Examiner—Richard J. Johnson
Attorney—Berman, Davidson and Berman

[57] ABSTRACT

A driving device for motor driven vehicles having an endless track with meshing holes, front and rear sprocket wheels meshing with the endless track, either of said sprocket wheels driven by the engine of the vehicle to drive in turn the endless track, a plurality of suspension wheel means and closing means for shutting the meshing holes of the endless track, the closing means held by the suspension wheel means, thereby, preventing snow from getting inside the endless track to render safe and smooth operation of the device.

6 Claims, 2 Drawing Figures

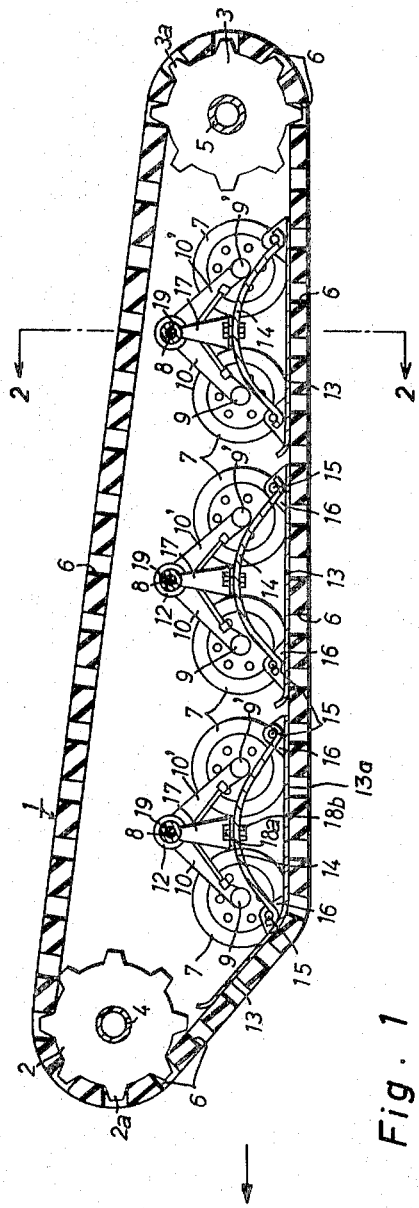
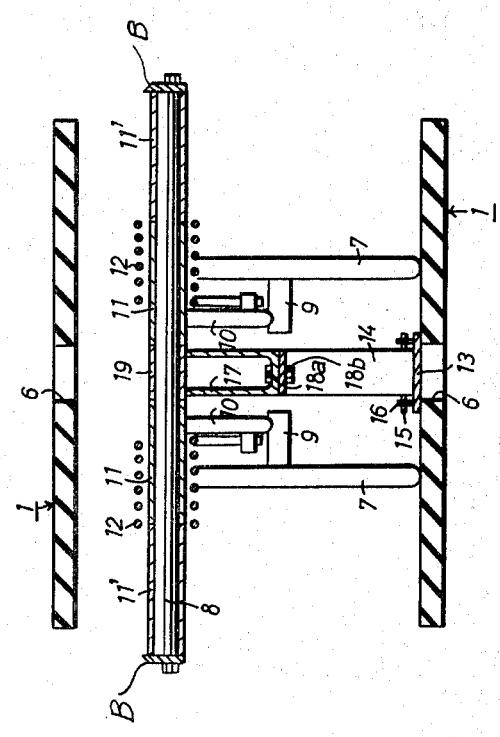

DRIVING DEVICE FOR MOTOR DRIVEN VEHICLES

The present invention relates to a driving device for motor driven vehicles such as snowmobiles, or tractors, and the like, and more particularly to an improved driving device having an endless track driven by power taken from the vehicle engine by means of a sprocket wheel positioned on the front or rear portion of the body of the vehicle, each of the sprocket wheels meshing with the endless track, and a plurality of suspension wheels suspended resiliently under the body of the vehicle to ensure good engagement of the outer, or ground-touching, face of the endless track with the ground.

Small snowmobiles of small size and the like heretofore known, have generally provided been installed with a driving device comprising a front sprocket wheel positioned under the front portion of the body of vehicle and driven by the power taken from the vehicle engine, a rear sprocket wheel journalled at the rear portion of the body, an endless track meshing with and driven by one of said sprocket wheels, and a plurality of suspension wheels provided under the body of the vehicle so as to hold the endless track in contact with the ground. In using of this type of vehicle, a major disadvantage is that snow gets inside the endless track through the meshing holes at the lower, or ground-touching portion. This particularly occurs on roads covered with freshly fallen snow, and the snow which enters the track becomes a large mass. This causes the endless track to bulge outwardly, to disengages the mesh between the sprocket wheels and the endless track and causes the upper portion of the endless track to touch the bottom of the body of the vehicle, resulting in unsafe erratic operation.

The most important object of the present invention is, therefore, to provide an improved driving device for a small snowmobile having an endless track and sprocket wheels journalled at the front and rear portions of the body of the vehicle to drive the endless track, said endless track being characterized by closing means installed resiliently under the body of the vehicle against the meshing holes for the sprocket wheels at the lower, or ground-touching, portion of the endless track so as to prevent snow from getting inside the endless track through the meshing holes thereof when the vehicle runs on snowy roads.

The second important object of the present invention is to provide an improved driving device, having the above described characteristics, wherein the closing means to shut off said meshing holes are adapted at least at the front head portion of the endless track when the vehicle runs forward, to more efficiently prevent snow from getting into the inside of the endless track through the meshing holes thereof.

The third important object of the present invention is to provide an improved driving device, having the above described characteristics, wherein said closing means are mounted by resilient members on the suspension axles of the suspension wheels and are suspended resiliently under the body of the vehicle to press down the endless track into contact with the ground, thereby enabling the closing means to be of simple construction and have stable and sure operation.

The novel features that are considered to be characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the Figures.

In the drawings:

FIG. 1 is a longitudinal cross-sectional view of a driving device for a small snowmobile in accordance with the present invention;

FIG. 2 is an enlarged cross-sectional view taken on line 2—2 of FIG. 1, with the body broken away for convenience of illustration.

Referring now more specifically to the drawings, an embodiment of the present invention comprises an endless track 1 provided with a number of meshing holes 6 arranged longitudinally along the center line of the width thereof, a front sprocket wheel 2 driven by a driving shaft 4 journalled at the front portion of the body B of the vehicle, and a rear sprocket wheel 3 secured on an idler shaft 5 at the rear portion of the body. The endless track 1 is stretched over the front and rear sprocket wheels 2 and 3, the teeth 2a and 3a of which mesh with the meshing holes 6 of the endless track 1 to drive the endless track 1 by rotation of the front sprocket wheel 2. A plurality of suspension wheels 7 are all journalled rotatably on axles 9 or 9' which are suspended swingably on shafts 8 by means of sleeves 11 or 11' and arms 10 or 10', said shafts 8 being transversally fixed under the body of the vehicle. Torsion springs 12 are coiled round the sleeves 11 and bias each pair of the suspension wheels 7 downward and inward towards each other, which makes the suspension wheels 7 press the endless track against the ground and act as shock absorbers for the body of the vehicle. U-shaped brackets 17 are journalled swingably on the central portions of the shafts 8 through shaft bearing members 19. Bow shaped leaf springs 14 are fastened on the bottoms of the U-shaped brackets 17 with bolts 18a and nuts 18b. The front and rear ends of the bow shaped leaf springs 14 being secured respectively to the front and the rear ends of closing plates 13 by metal fittings 16 on closing plates 13 and holding pins 15. The closing plates 13 slide on and shut the meshing holes 6 of the endless track 1 resiliently through the force of the bow shaped leaf springs 14 at the intermediate spaces between pairs of suspension wheels 7 on the inner side of the endless track 1. As shown in FIG. 1, it is most desirable that the frontmost closing plate 13a have an extended front section, giving it a somewhat shaped configuration.

When a snowmobile provided with the above described improved driving device runs on roads covered with fresh snow, the closing plates 13 prevent most snow from getting into the inside of the endless track 1 through the meshing holes 6 facing the ground.

Now it should be clear that although the above preferred embodiment adopts a plurality of closing plate 13, good efficiency in keeping snow out of the inside of the endless track 1 is obtainable substantially with the substantially L-letter shaped closing plate 13a positioned at the front of the track.

Although certain specific embodiments of the present invention have been shown and described, it is obvious that many modifications thereof are possible, the differences of the styles and constructions of the endless track, the suspension wheels, and so forth. The present invention is, therefore, not intended to be restricted to the exact showing of the drawings and description thereof, but is considered to include reasonable and obvious equivalents.

What is claimed is:

1. In a driving device for a motor driven snow vehicle comprising a vehicle body, a pair of power driven toothed sprocket wheels journaled on opposite ends of said body, a flexible endless track engaged over said sprocket wheels and having a plurality of spaced apart holes formed therein for meshing with the teeth of said sprocket wheels, the improvement comprising:
   a. a transverse shaft fixedly secured to said body in underlying relation thereto;
   b. a pair of arms journaled on said shaft;
   c. resilient means biasing said arms downwardly and inwardly toward each other;
   d. an axle secured to the lower end of each of said arms;
   e. a track-engaging wheel journaled on each of said axles;
   f. a bracket journaled on and depending from said shaft;
   g. a leaf spring mounted on the lower end of said bracket; and
   h. a covering plate secured to said leaf spring and biased into hole covering contact with the inner face of said track.

2. In a driving device for a motor driven vehicle comprising a vehicle body, a pair of power driven toothed sprocket wheels journaled on front and rear ends of said body, a flexible endless track engaged over said sprocket wheels and having a plurality of longitudinally spaced apart holes formed therein for meshing with the teeth of said sprocket wheels, the improvement, comprising:
   a. a transverse shaft fixedly secured to said body;
   b. a pair of frontwardly and rearwardly extending arms journaled on said transverse shaft;
   c. first resilient means biasing said arms downwardly and inwardly toward each other;
   d. track-engaging suspension wheels mounted on said arms;
   e. a plurality of closing plates engaging with said track to cover said holes at the inside of the lower run of said track and supported under and by said body along the longitudinal line on which said holes are located; and
   f. second resilient means comprising separate spring means for each of said closing plates mounted on the lower portion of said body for urging said closing plates onto the inner face of said track.

3. A driving device for a motor driven snow vehicle as set forth in claim 2 wherein the closing plate closest to the forward end of said vehicle is substantially L-shaped.

4. A driving device for a motor driven snow vehicle as set forth in claim 2 wherein each of said spring means is swingably suspended from said transverse shaft.

5. A driving device for a motor driven snow vehicle as set forth in claim 2 wherein each of said spring means comprises a bow-shaped leaf spring.

6. A driving device for a motor driven snow vehicle as set forth in claim 5 wherein each of said leaf springs is mounted on a bracket journaled on said transverse shaft.

* * * * *